US012631808B2

(12) United States Patent
Hunt et al.

(10) Patent No.: US 12,631,808 B2
(45) Date of Patent: May 19, 2026

(54) OPTICAL DEVICES CONTAINING MULTI-LAYER OPTICAL ARTICLES WITH AN IR-ABSORBING ADHESIVE LAYER

(71) Applicant: 3M INNOVATIVE PROPERTIES COMPANY, St. Paul, MN (US)

(72) Inventors: Bryan V. Hunt, Nowthen, MN (US); Ying Zhang, Woodbury, MN (US); Ian Dailey, Maplewood, MN (US); Nicholas L. Untiedt, Minneapolis, MN (US); Neeraj Sharma, Lake Elmo, MN (US); Nicole L. Wills, Eagan, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 440 days.

(21) Appl. No.: 18/247,162

(22) PCT Filed: Sep. 17, 2021

(86) PCT No.: PCT/IB2021/058498

§ 371 (c)(1),
(2) Date: Mar. 29, 2023

(87) PCT Pub. No.: WO2022/079519

PCT Pub. Date: Apr. 21, 2022

(65) Prior Publication Data

US 2025/0277924 A1 Sep. 4, 2025

Related U.S. Application Data

(60) Provisional application No. 63/092,170, filed on Oct. 15, 2020.

(51) Int. Cl.
*G02B 5/20* (2006.01)
*B32B 7/023* (2019.01)

(52) U.S. Cl.
CPC .............. *G02B 5/208* (2013.01); *B32B 7/023* (2019.01)

(58) Field of Classification Search
None
See application file for complete search history.

(56) References Cited

U.S. PATENT DOCUMENTS 5,223,465 A 6/1993 Ueki et al.
RE34,605 E 5/1994 Schrenk et al.
(Continued)

FOREIGN PATENT DOCUMENTS

JP 2009084400 A 4/2009
JP 2019200399 A 11/2019
(Continued)

OTHER PUBLICATIONS

International Search Report received for PCT International Application No. PCT/IB2021/058498, mailed on Dec. 21, 2021, 3 pages.

*Primary Examiner* — Derek S. Chapel
(74) *Attorney, Agent, or Firm* — Clifton F. Richardson; Jeffrey M. Olofson

(57) ABSTRACT

Optical devices include a visible light source, a visible light detector, and a multi-layer film article in the pathway between the visible light source and the visible light detector. The multi-layer film article includes an optical film layer and an optically clear adhesive layer. The optically clear adhesive layer includes a polymeric adhesive matrix, and at least one infrared light absorbing material that absorbs light in the range of 680-1100 nanometers. The infrared light absorbing material is an organic dye.

6 Claims, 10 Drawing Sheets

(56) References Cited

U.S. PATENT DOCUMENTS

| | | | | |
|---|---|---|---|---|
| 5,360,659 | A | 11/1994 | Arends et al. | |
| 5,527,578 | A | 6/1996 | Mazurek et al. | |
| 5,579,162 | A | 11/1996 | Bjornard et al. | |
| 5,811,923 | A * | 9/1998 | Zieba | G02B 5/208 348/835 |
| 5,858,545 | A | 1/1999 | Everaerts et al. | |
| 5,882,774 | A | 3/1999 | Jonza et al. | |
| 5,956,175 | A * | 9/1999 | Hojnowski | G02B 5/208 359/360 |
| 6,007,914 | A | 12/1999 | Joseph et al. | |
| 6,049,419 | A | 4/2000 | Wheatley et al. | |
| 10,216,975 | B1 | 2/2019 | He et al. | |
| 2003/0035972 | A1 * | 2/2003 | Hanson | B32B 7/023 428/912.2 |
| 2009/0002620 | A1 | 1/2009 | Yamashita et al. | |
| 2015/0185383 | A1 | 7/2015 | Katoh et al. | |
| 2018/0370205 | A1 * | 12/2018 | Markowicz | B32B 7/12 |
| 2019/0111659 | A1 * | 4/2019 | Hatazawa | B32B 27/34 |
| 2019/0369314 | A1 | 12/2019 | Hebrink et al. | |

FOREIGN PATENT DOCUMENTS

| | | | |
|---|---|---|---|
| WO | 2000002966 | A1 | 1/2000 |
| WO | 2013025443 | A2 | 2/2013 |
| WO | 2020031140 | A2 | 2/2020 |

* cited by examiner

OPTICAL DEVICES CONTAINING MULTI-LAYER OPTICAL ARTICLES WITH AN IR-ABSORBING ADHESIVE LAYER

CROSS REFERENCE TO RELATED APPLICATIONS

This application is a national stage filing under 35 U.S.C. 371 of PCT/IB2021/058498, filed Sep. 17, 2021, which claims the benefit of U.S. Application No. 63/092,170, filed Oct. 15, 2020, the disclosures of which are incorporated by reference in their entirety herein.

FIELD OF THE DISCLOSURE

The current disclosure relates to multi-layer articles that contain an optically clear adhesive layer that contains infrared light absorbing material, and devices that contain these multi-layer optical articles.

BACKGROUND

A wide range of optical and electronic articles have multiple layers of films and substrates. The multiple layers often are adhered to each other with adhesive layers. The optical articles can have a wide range of uses such as sensing articles, display articles, and the like.

SUMMARY

Disclosed herein are multi-layer optical articles and optical devices that contain these multi-layer articles. In some embodiments, the optical device comprises a fingerprint sensor. In some embodiments, the optical device (300) configured to sense a presence of a finger (10), comprises an emissive display (20) configured to emit a visible image (21) in a visible wavelength range extending from about 420 nm to about 680 nm, a visible light source (30, 31, 32) configured to emit light (30*a*, 31*a*, 32*a*) having a first wavelength (64) in the visible wavelength range, a visible light detector (40) configured to detect the emitted light after the emitted light is reflected (30*b*, 31*b*, 32*b*) by the finger, and a multi-layer film article (50) in the pathway between the visible light source and the visible light detector. The multi-layer film article comprises a first optical film layer (60) comprising a plurality of polymeric layers (61, 62) numbering at least 10 in total, each of the polymeric layers having an average thickness less than about 400 nm, such that for an incident light (70) incident on the first optical film layer and for at least one polarization state (x-axis), the plurality of polymeric layers reflects at least 70% of the incident light having the first wavelength for each of a first incident angle (θ) of less than about 5 degrees and a second incident angle of greater than about 45 degrees, reflects at least 70% of the incident light having a second wavelength (65) in an infrared wavelength range extending from about 680 nm to about 1100 nm for the first incident angle, and transmits at least 40% of the incident light having the second wavelength for the second incident light. The multi-layer film also has an optically clear adhesive layer (80) disposed on at least a portion of the first optical film layer, the optically clear adhesive layer comprising a polymeric adhesive matrix, and at least one infrared light absorbing material that absorbs light having the second wavelength.

Also disclosed are multi-layer film articles. In some embodiments, the multi-layer film article comprises a first optical film layer with a first major surface and a second major surface and an optically clear adhesive layer with a first major surface and a second major surface, where the first major surface of the optically clear adhesive layer is disposed on at least a portion of the second major surface of the first optical film layer. The optically clear adhesive layer comprises a polymeric adhesive matrix, and at least one infrared light absorbing material that absorbs light in the range of 680-1100 nanometers.

In some embodiments, the multi-layer optical article comprises a first optical film layer with a first major surface and a second major surface and an optically clear adhesive layer with a first major surface and a second major surface, where the first major surface of the optically clear adhesive layer is disposed on at least a portion of the second major surface of the first optical film layer. The optically clear adhesive layer comprises a polymeric adhesive matrix, and at least one infrared light absorbing material comprising a diimonium dye, an anthraquinone dye, an aminium dye, a cyanine dye, a merocyanium dye, a croconium dye, a squarylium dye, a rylene dye, an azulenium dye, a polymethyne dye, a naphthoquinone dye, a pyrilium dye, a phthalocyanine dye, a naphthalocyanine dye, a naphthlolactam dye, an azo dye, an indigo dye, a perinone dye, a terrylene dye, a dioxadine dye, a quinacridone dye, an isodorynone dye, a quinophthalone dye, a pyrrol dye, or a thioindigo dye.

BRIEF DESCRIPTION OF THE DRAWINGS

The present application may be more completely understood in consideration of the following detailed description of various embodiments of the disclosure in connection with the accompanying drawings.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

A wide range of optical articles have multiple layers. The multiple layers often are adhered to each other with adhesive layers. These adhesive layers have a wide range of desired or required properties. Achieving some properties is very complex process. Adhesive layers are designed to adhere together two films or substrates, but additional properties are also generally required of the adhesive layers. Many of these properties are difficult to achieve since imparting a new property to the adhesive layer cannot be achieved by sacrificing adhesive properties.

A range of optically clear adhesive properties have been developed for use in optical articles. These adhesives have adhesive properties and also are optically clear. This combination of properties makes them very desirable for a wide range of uses. In some uses, it is desirable for the optically clear adhesive to have additional properties. However, these new properties cannot be achieved by sacrificing the adhesive or optical properties.

Figure 10:
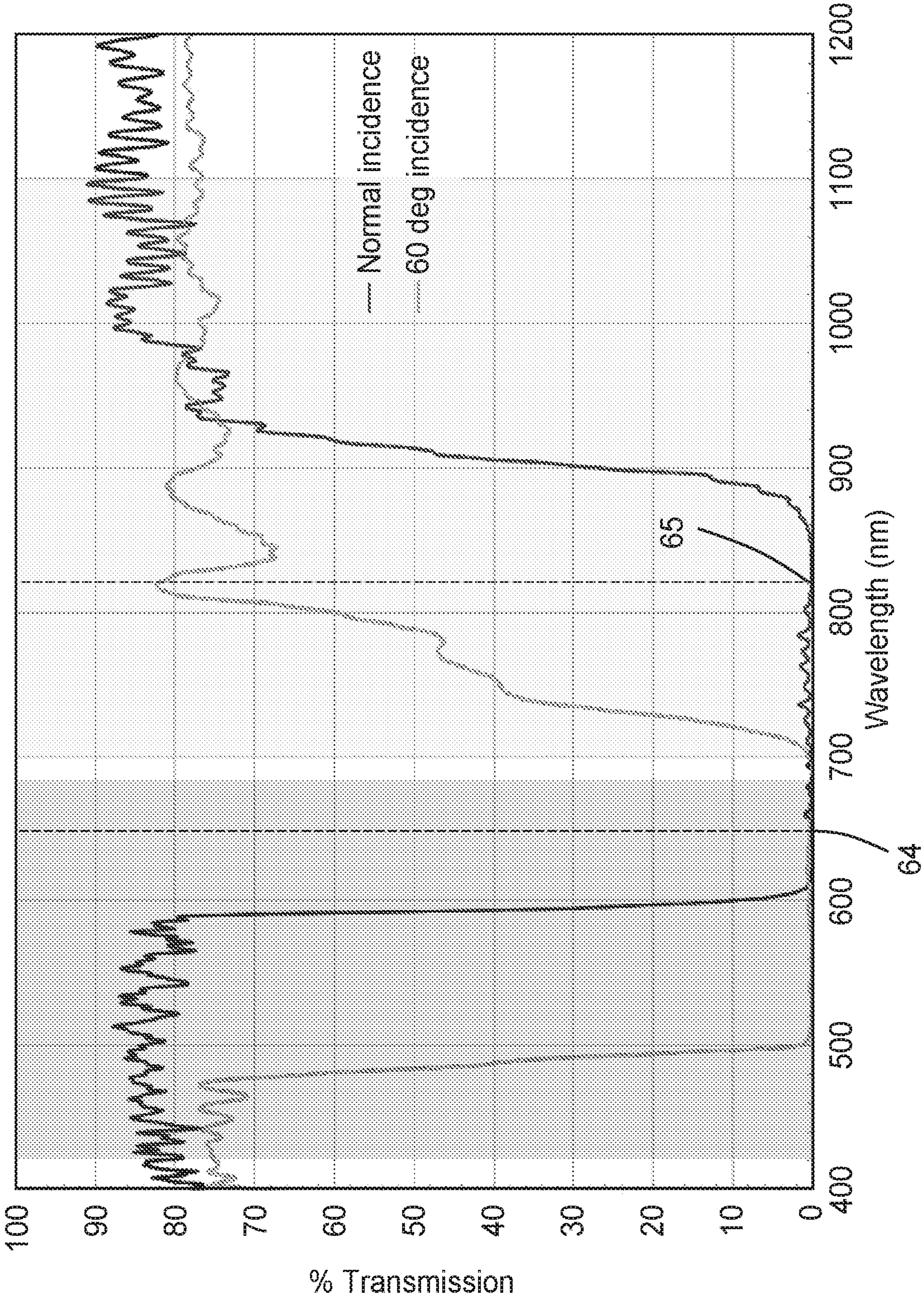
FIG. 10 is a graph of the % Transmission at different angles of incidence for a comparative multi-layer optical article.

Among optical articles that use multiple layers of optical films or substrates are optical sensing devices, such as fingerprint sensors. In these articles, typically a multi-layer optical film is included that reflects incident light, including IR (infrared) light. The multi-layer optical films are effective at reflecting incident light when the incident light is normal to the optical film. However, when the incident light is "off axis", meaning that the light is not normal to the optical film. In particular, when the angles of incidence range from, for example 5-60°, while still partially reflected by the multi-layer optical film, permit transmission of at least 40% of at least some wavelengths of IR light. IR light can be problematic because it can interfere with the signal. In use, off axis IR light is an issue because it can penetrate through the finger or get around the finger at an off axis angle. FIG. 10 shows a graph illustrating the % Transmission of a multi-layer article at normal incidence and with a 60° incidence angle. The graph clearly shows that with a 60° incidence angle, considerable IR light is transmitted that is not transmitted at a normal angle of incidence. Therefore, it is desirable to add an IR absorbing layer to the sensor to absorb the off axis IR light that is not reflected by the multi-layer optical film. However, it is not desirable to add another layer to an already complicated combination of layers. Therefore, it is desirable to modify a layer already present to achieve the desired absorption of IR light. Since adhesive layers are present in the multi-layer articles, it would be desirable to modify an optically clear adhesive (OCA) with an IR absorbent. However, this modification cannot adversely affect the optical clarity of the layer.

In the current disclosure, an adhesive layer is disclosed that retains a high level of visible light transmission and additionally absorbs IR light. These adhesive layers comprise an optically clear adhesive (OCA) with an IR absorbent.

The multi-layer optical articles can be used in optical devices, such as devices that include an optical source, an optical detector, with multi-layer articles in the optical path between the optical source and optical detector.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are pressure sensitive adhesives.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The term "(meth)acrylate" refers to monomeric acrylic or methacrylic esters of alcohols. Acrylate and methacrylate monomers or oligomers are referred to collectively herein as "(meth)acrylates". Materials referred to as "(meth)acrylate functional" are materials that contain one or more (meth) acrylate groups. Polymers described as "(meth)acrylate-based" contain a majority by weight of at least one (meth) acrylate monomer and may contain other ethylenically unsaturated co-monomers.

The terms "room temperature" and "ambient temperature" are used interchangeably to mean temperatures in the range of 20° C. to 25° C.

The terms "Tg" and "glass transition temperature" are used interchangeably. If measured, Tg values are determined by Differential Scanning Calorimetry (DSC) at a scan rate of 10° C./minute, unless otherwise indicated. Typically, Tg values for copolymers are not measured but are calculated using the well-known Fox Equation, using the monomer Tg values provided by the monomer supplier, as is understood by one of skill in the art.

The term "adjacent" as used herein when referring to two layers means that the two layers are in proximity with one another with no intervening open space between them. They may be in direct contact with one another (e.g. laminated together) or there may be intervening layers.

The terms "polymer" and "macromolecule" are used herein consistent with their common usage in chemistry. Polymers and macromolecules are composed of many repeated subunits. As used herein, the term "macromolecule" is used to describe a group attached to a monomer that has multiple repeating units. The term "polymer" is used to describe the resultant material formed from a polymerization reaction.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof. Some heteroalkylenes are poloxyyalkylenes where the heteroatom is oxygen such as for example, $—CH_2CH_2(OCH_2CH_2)_nOCH_2CH_2—$.

The terms "free radically polymerizable" and "ethylenically unsaturated" are used interchangeably and refer to a reactive group which contains a carbon-carbon double bond which is able to be polymerized via a free radical polymerization mechanism.

Unless otherwise indicated, the terms "optically transparent", and "visible light transmissive" are used interchangeably, and refer to an article, film or adhesive that has a high light transmittance over at least a portion of the visible light spectrum (about 400 to about 700 nm). Typically, optically transparent articles have a visible light transmittance of at least 80% of incident light that is not reflected from the surface and a haze of less than 10%.

Unless otherwise indicated, "optically clear" refers to an adhesive or article that has a high light transmittance over at least a portion of the visible light spectrum (about 400 to about 700 nm), and that exhibits low haze, typically less than about 5%, or even less than about 2%. In some embodiments, optically clear articles exhibit a haze of less than 1% at a thickness of 50 micrometers or even 0.5% at a thickness of 50 micrometers. Typically, optically clear articles have a visible light transmittance of at least 95%, often higher such as 97%, 98% or even 99% or higher.

As used herein, the term "infrared light absorbing", "IR light absorbing", or "IR absorbing" are used interchangeably and refer to materials that absorb light over at least some portion of the infrared light spectrum from about 680 nm to 1100 nm.

Disclosed herein are multi-layer film articles. In some embodiments, the multi-layer film article comprises a first optical film layer with a first major surface and a second major surface, and an optically clear adhesive layer with a first major surface and a second major surface, wherein the first major surface of the optically clear adhesive layer is disposed on at least a portion of the second major surface of the first optical film layer. The optically clear adhesive layer comprises a polymeric adhesive matrix, and at least one infrared light absorbing material that absorbs light in the range of 680-1100 nanometers. These optically clear adhesive layers that contain infrared light absorbing material can be described in two different ways, by the light absorbing properties and by the compositional properties. In some embodiments, the at least one infrared light absorbing material has a ratio of the minimum transmission at 680-1100 nanometers to the transmission at 500 nanometers of from 0 to 0.5. In some embodiments, the ratio is less than 0.4, less than 0.3, less than 0.2, less than 0.1, or even less than 0.05. Therefore, the optically clear adhesive layer transmits visible light and absorbs IR light. In other embodiments, the optically clear adhesive layer is described by the chemical description of the infrared absorbing material, typically an infrared absorbing dye. Descriptions of suitable infrared absorbing dyes are given below.

A wide variety of optically clear pressure sensitive adhesive compositions are suitable. The pressure sensitive adhesive component can be a single pressure sensitive adhesive, or the pressure sensitive adhesive can be a combination of two or more pressure sensitive adhesives.

Suitable pressure sensitive adhesives include, for example, those based on natural rubbers, synthetic rubbers, styrene block copolymers, polyvinyl ethers, poly(meth)acrylates (including both acrylates and methacrylates), polyolefins, or silicones.

Particularly suitable are (meth)acrylate-based pressure sensitive adhesives. In some embodiments, the (meth)acrylate-based pressure sensitive is a radiation curable pressure sensitive adhesive as described below. In other embodiments, the (meth)acrylate-based pressure sensitive adhesive is not radiation curable.

The optically clear (meth)acrylate-based pressure sensitive adhesives may be (meth)acrylate copolymers comprising one of more alkyl (meth)acrylate monomers in combination with other ethylenically unsaturated monomers. Useful alkyl (meth)acrylates (i.e., acrylic acid alkyl ester monomers) include linear or branched monofunctional unsaturated acrylates or methacrylates of non-tertiary alkyl alcohols, the alkyl groups of which have from 4 to 14 and, in particular, from 4 to 12 carbon atoms. Typically, the poly(meth)acrylic pressure sensitive adhesives are derived from, for example, at least one alkyl (meth)acrylate ester monomer such as, for example, isooctyl acrylate, isononyl acrylate, 2-methyl-butyl acrylate, 2-ethyl-n-hexyl acrylate and n-butyl acrylate, isobutyl acrylate, hexyl acrylate, n-octyl acrylate, n-octyl methacrylate, n-nonyl acrylate, isoamyl acrylate, n-decyl acrylate, isodecyl acrylate, isodecyl methacrylate, isobornyl acrylate, 4-methyl-2-pentyl acrylate and dodecyl acrylate; and at least co-monomer component such as, for example, (meth)acrylic acid, vinyl acetate, N-vinyl pyrrolidone, (meth)acrylamide, a vinyl ester, a fumarate, a styrene macromer, alkyl maleates and alkyl fumarates (based, respectively, on maleic and fumaric acid), or combinations thereof.

Particularly suitable (meth)acrylate-based pressure sensitive adhesives include copolymers derived from: (A) at least one monoethylenically unsaturated alkyl (meth) acrylate monomer (i.e., alkyl acrylate and alkyl methacrylate monomer); and (B) at least one monoethylenically unsaturated free-radically copolymerizable reinforcing monomer. The reinforcing monomer has a homopolymer glass transition temperature (Tg) higher than that of the alkyl (meth)acrylate monomer and is one that increases the glass transition temperature and cohesive strength of the resultant copolymer. Herein, "copolymer" refers to polymers containing two or more different monomers, including terpolymers, tetrapolymers, etc.

Monomer A, which is a monoethylenically unsaturated alkyl acrylate or methacrylate (i.e., (meth)acrylic acid ester), contributes to the flexibility and tack of the copolymer. Generally, monomer A has a homopolymer Tg of no greater than about 0° C. Typically, the alkyl group of the (meth) acrylate has an average of about 4 to about 20 carbon atoms, or an average of about 4 to about 14 carbon atoms. The alkyl group can optionally contain oxygen atoms in the chain thereby forming ethers or alkoxy ethers, for example. Examples of monomer A include, but are not limited to, 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, and isononyl acrylate. Other examples include, but are not limited to, (meth)acrylate monomers that contain heteroatoms or heteroatom groups such as hydroxyl groups or heteroalkylene groups. Examples of such monomers include HEA (hydroxylethyl acrylate), HEMA (hydroxylethyl methacrylate), polyethoxylated or -propoxylated methoxy (meth)acrylates such as acrylates of CARBOWAX (commercially available from Union Carbide) and NK ester AM90G (commercially available from Shin Nakamura Chemical, Ltd., Japan). Combinations of various monomers categorized as an A monomer can be used to make the copolymer.

Monomer B, which is a monoethylenically unsaturated free-radically copolymerizable reinforcing monomer, increases the glass transition temperature and cohesive strength of the copolymer. Generally, monomer B has a homopolymer Tg of at least about 10° C. Typically, monomer B is a reinforcing (meth)acrylic monomer, including an acrylic acid, a methacrylic acid, an acrylamide, or a (meth) acrylate. Examples of monomer B include, but are not limited to, acrylamides, such as acrylamide, methacrylamide, N-methyl acrylamide, N-ethyl acrylamide, N-hydroxyethyl acrylamide, diacetone acrylamide, N,N-dimethyl acrylamide, N, N-diethyl acrylamide, N-ethyl-N-aminoethyl acrylamide, N-ethyl-N-hydroxyethyl acrylamide, N,N-dihydroxyethyl acrylamide, t-butyl acrylamide, N,N-dimethylaminoethyl acrylamide, and N-octyl acrylamide. Other examples of monomer B include itaconic acid, crotonic acid, maleic acid, fumaric acid, 2,2-(diethoxy)ethyl acrylate, 2-hydroxyethyl acrylate or methacrylate, 3-hydroxypropyl acrylate or methacrylate, methyl methacrylate, isobornyl acrylate, 2-(phenoxy)ethyl acrylate or methacrylate, biphenylyl acrylate, t-butylphenyl acrylate, cyclohexyl acrylate, dimethyladamantyl acrylate, 2-naphthyl acrylate, phenyl acrylate, N-vinyl formamide, N-vinyl acetamide, N-vinyl pyrrolidone, and N-vinyl caprolactam. Particularly suitable reinforcing acrylic monomers that can be used as monomer B include acrylic acid and acrylamide. Combinations of various reinforcing monoethylenically unsaturated monomers categorized as a B monomer can be used to make the copolymer. In some embodiments, the optically clear pressure sensitive adhesive comprises a (meth)acrylate copolymer of 2-ethylhexyl acrylate, 2-ethylhexylmethacrylate, 2-hydroxyethyl acrylate, and acrylamide.

Another example of a suitable (meth)acrylate-based pressure sensitive adhesive is the radiation curable pressure sensitive adhesive described in PCT Publication No. 2013/025443. This adhesive is a (meth)acrylate copolymer having a radiation reactive site. Typically, the radiation reactive site is a photo-crosslinkable site, and more typically a UV crosslinkable site. The (meth)acrylate copolymer is prepared from two or more types of monomer. At least one of the monomers is a (meth)acrylate monomer having a radiation reactive site. Generally, the amount of (meth)acrylate monomer having a radiation reactive site, is about 0.1 weight %, about 0.2 weight %, or about 0.3 weight % based on the total weight of monomers.

In some embodiments, the radiation reactive site is a UV crosslinkable site. Examples include structures capable of being excited by UV irradiation and abstracting a hydrogen radical from within the same molecule or from a different (meth)acrylic copolymer molecule. Examples of such structures include benzophenones, benzyls, o-benzoyl benzoic esters structure, thioxantones, 3-ketocoumarins, 2-ethylanthoraquinones, camphorquinones, and the like. All of the above structures are capable of being excited by UV irradiation, and abstracting a hydrogen radical from a (meth) acrylate copolymer molecule and forming radicals that can form crosslinks. Benzophenones are particularly suitable. Examples of suitable monomers include (meth)acrylates having a benzophenone structure, such as 4-acryloyloxy benzophenone, 4-acryloyloxyethoxy benzophenone, 4-acryloyloxy-4'-methoxy benzophenone, 4-acryloyloxyethoxy-4'-methoxy benzophenone, 4-acryloyloxy-4'-bromo benzophenone, 4-acryloyloxyethoxy-4'-bromo benzophenone, 4-methacryloyloxy benzophenone, 4-methacryloyloxyethoxy benzophenone, 4-methacryloyloxy-4'-methoxy benzophenone, 4-methacryloyloxyethoxy-4'-methoxy benzophenone, 4-methacryloyloxy-4'-bromo benzophenone, 4-methacryloyloxyethoxy-4'-bromo benzophenone, and mixtures thereof.

In addition to the monomer containing a radiation reactive site the (meth)acrylate copolymer typically contains an alkyl (meth)acrylate, typically having from 2 to 26 carbon atoms in the alkyl group. Examples of suitable (meth)acrylate monomers include ethyl acrylate, ethyl methacrylate, n-butyl acrylate, n-butyl methacrylate, isobutyl acrylate, isobutyl methacrylate, hexyl acrylate, hexyl methacrylate, n-octyl acrylate, n-octyl methacrylate, 2-ethylhexyl acrylate, 2-ethylhexyl methacrylate, isoamyl acrylate, isooctyl acrylate, isononyl acrylate, decyl acrylate, isodecyl acrylate, isodecyl methacrylate, lauryl acrylate, lauryl methacrylate, tridecyl acrylate, tridecyl methacrylate, tetradecyl acrylate, tetradecyl methacrylate, hexadecyl acrylate, hexadecyl methacrylate, stearyl acrylate, stearyl methacrylate, isostearyl acrylate, isostearyl methacrylate, eicosanyl acrylate, eicosanyl methacrylate, hexacosanyl acrylate, hexacosanyl methacrylate, 2-methylbutyl acrylate, 4-methyl-2-pentyl acrylate, 4-t-butylcyclohexyl methacrylate, cyclohexyl methacrylate, isobornyl acrylate, mixtures thereof, and the like. Typically, the alkyl (meth)acrylate monomer or monomers are present in an amount of 60 weight %, 70 weight %, or 80 Weight % based on the total weight of monomers. In some embodiments, about 95 weight % or less, 92 weight % or less, or 90 weight % or less based on the total weight of monomers.

Another class of optically clear pressure sensitive adhesives that may be suitable is siloxane-based adhesives. Siloxane-based pressure sensitive adhesives include, for example, those described in U.S. Pat. Nos. 5,527,578 and 5,858,545; and PCT Publication No. WO 00/02966. Specific examples include polydiorganosiloxane polyurea copolymers and blends thereof, such as those described in U.S. Pat. No. 6,007,914, and polysiloxane-polyalkylene block copolymers. Other examples of siloxane pressure sensitive adhesives include those formed from silanols, silicone hydrides, siloxanes, epoxides, and (meth)acrylates. When the siloxane pressure sensitive adhesive is prepared from (meth)acrylate-functional siloxanes, the adhesive is sometimes referred to as a siloxane (meth)acrylate.

A wide range of IR absorbing materials are suitable for use in the optically clear adhesives of this disclosure. In some embodiments, the infrared light absorbing material comprises an infrared light absorbing dye. In other embodiments, the infrared light absorbing material comprises infrared absorbing nanoparticles. In yet other embodiments, the infrared light absorbing material comprises a combination of infrared light absorbing dye and infrared absorbing nanoparticles. Typically, the infrared light absorbing nanoparticles comprise agglomerated infrared light absorbing dye. In these embodiments, some of the dye may be dispersed within the matrix and some of the dye may remain undispersed as nanoparticles.

A wide range of infrared absorbing dyes are suitable. The dyes are generally aromatic compounds or salts that absorb light over at least some portion of the infrared spectrum. Examples of infrared absorbing dyes include diimonium dyes, anthraquinone dyes, aminium dyes, cyanine dyes, merocyanium dyes, croconium dyes, squarylium dyes, rylene dyes (which encompass quaterrylene, as well as perylene, and other higher analog dyes as well as the terrylene dyes listed below), azulenium dyes, polymethyne dyes, naphthoquinone dyes, pyrilium dyes, phthalocyanine dyes, naphthalocyanine dyes, naphthlolactam dyes, azo dyes, indigo dyes, perinone dyes, terrylene dyes, dioxadine dyes, quinacridone dyes, isodorynone dyes, quinophthalone dyes, pyrrol dyes, and thioindigo dyes.

Among the suitable infrared light absorbing dyes are those commercially available from BASF under the trade name LUMOGEN such as LUMOGEN IR765 and LUMOGEN IR788; those known as "WDR-3" (CAS #211991-63-8); "DBT BF4", (CAS #494762-23-1); those commercially available from Epolin under the tradename of EPOLIGHT such as EPOLIGHT 5839, EPOLIGHT 1117, and EPOLIGHT 1178; and SDA 7293 available from H. W. Sand.

In some embodiments, the IR light absorbing dye or combination of dyes is present in the polymeric adhesive matrix at a level of 0.1-10 weight % based upon the total dry weight of the matrix. In some embodiments, the IR light absorbing dye or combination of dyes is present in the polymeric adhesive matrix at a level of 1-10 weight % based upon the total dry weight of the matrix, or even 2-8 weight %, or even 2-6 weight %.

The multi-layer film articles of this disclosure comprise a first optical film, referred to herein as the first optical film. In some embodiments, the optical film comprises a single-layer optical film. In other embodiments, the optical film comprises a multi-layer optical film.

As used herein, the term "optical film" refers to a film that can be used to produce an optical effect. The optical films are typically polymer-containing films that can be a single layer or multiple layers. The optical films are flexible and can be of any suitable thickness. The optical films often are at least partially transmissive, reflective, antireflective, polarizing, optically clear, or diffusive with respect to some wavelengths of the electromagnetic spectrum (e.g., wavelengths in the visible, ultraviolet, or infrared regions of the electromagnetic spectrum). Exemplary optical films include, but are not limited to, visible mirror films, color mirror films, solar reflective films, collimating films, ultraviolet reflective films, brightness enhancement films, reflective polarizer films such as dual brightness enhancement films, absorptive polarizer films, optically clear films, tinted films, and antireflective films.

Some optical films have multiple layers such as multiple layers of polymer-containing materials (e.g., polymers with or without dyes) or multiple layers of metal-containing material and polymeric materials. Some optical films have alternating layers of polymeric material with different indexes of refraction. Other optical films have alternating polymeric layers and metal-containing layers. Exemplary optical films are described in the following patents: U.S. Pat. No. 6,049,419 (Wheatley et al.); U.S. Pat. No. 5,223,465 (Wheatley et al.); U.S. Pat. No. 5,882,774 (Jonza et al.); U.S. Pat. No. 6,049,419 (Wheatley et al.); U.S. Pat. No. RE 34,605 (Schrenk et al.); U.S. Pat. No. 5,579,162 (Bjornard et al.); and U.S. Pat. No. 5,360,659 (Arends et al.).

In some embodiments, the multi-layer film article further comprise a second optical film where the second optical film has a first major surface and a second major surface, where the first major surface of the second optical film is in contact with at least a portion of the second major surface of the optically clear adhesive layer.

The second optical film, like the first optical film may comprise a single-layer optical film or a multi-layer optical film. The films described above for the first optical film are also suitable for the second optical film. The first and second optical films may be the same or different.

Also disclosed herein are optical devices. The optical devices comprise a visible light source, a visible light detector, and a multi-layer film article in the pathway between the visible light source and the visible light detector. The multi-layer film articles have been described above and transmit visible light and absorb IR light. In some embodiments, the multi-layer film article comprises a first optical film layer with a first major surface and a second major surface, and an optically clear adhesive layer with a first major surface and a second major surface, where the first major surface of the optically clear adhesive layer is disposed on at least a portion of the second major surface of the first optical film layer. As described above, the optically clear adhesive layer comprises a polymeric adhesive matrix, and at least one infrared light absorbing material that absorbs light in the range of 680-1100 nanometers. In some embodiments, the at least one infrared light absorbing material has a ratio of the minimum transmission at 680-1100 nanometers to the transmission at 500 nanometers of from 0 to 0.5. In some embodiments, the ratio is less than 0.4, less than 0.3, less than 0.2, less than 0.1, or even less than 0.05.

Suitable optically clear adhesives, IR light absorbing materials, and optical films have all been described in detail above. In some embodiments, the multi-layer film article further comprises a second optical film where the second optical film has a first major surface and a second major surface, where the first major surface of the second optical film is in contact with at least a portion of the second major surface of the optically clear adhesive layer.

Figure 6:
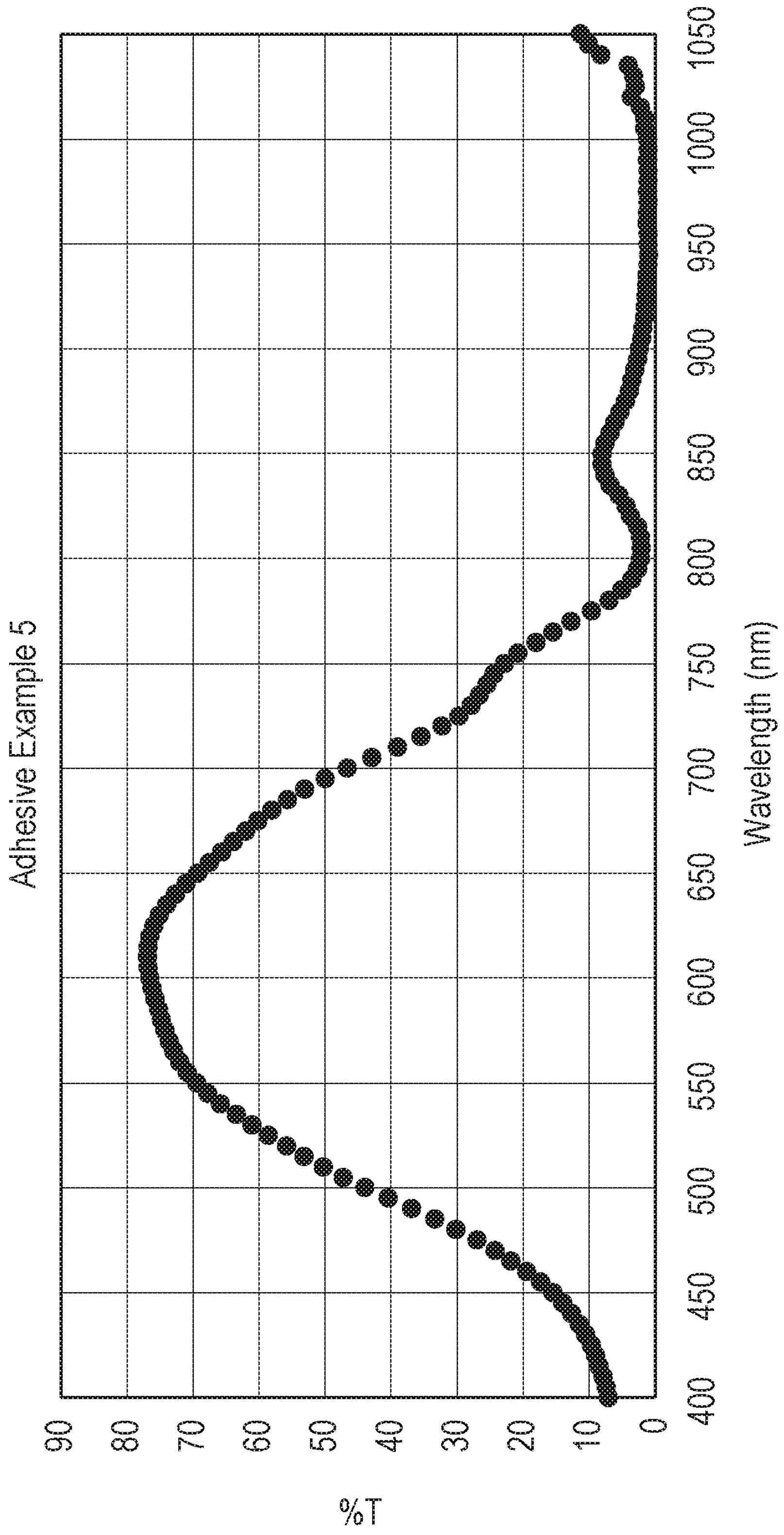
FIG. 6 is a graph of the % Transmission of Adhesive Example 5.
Figure 7:
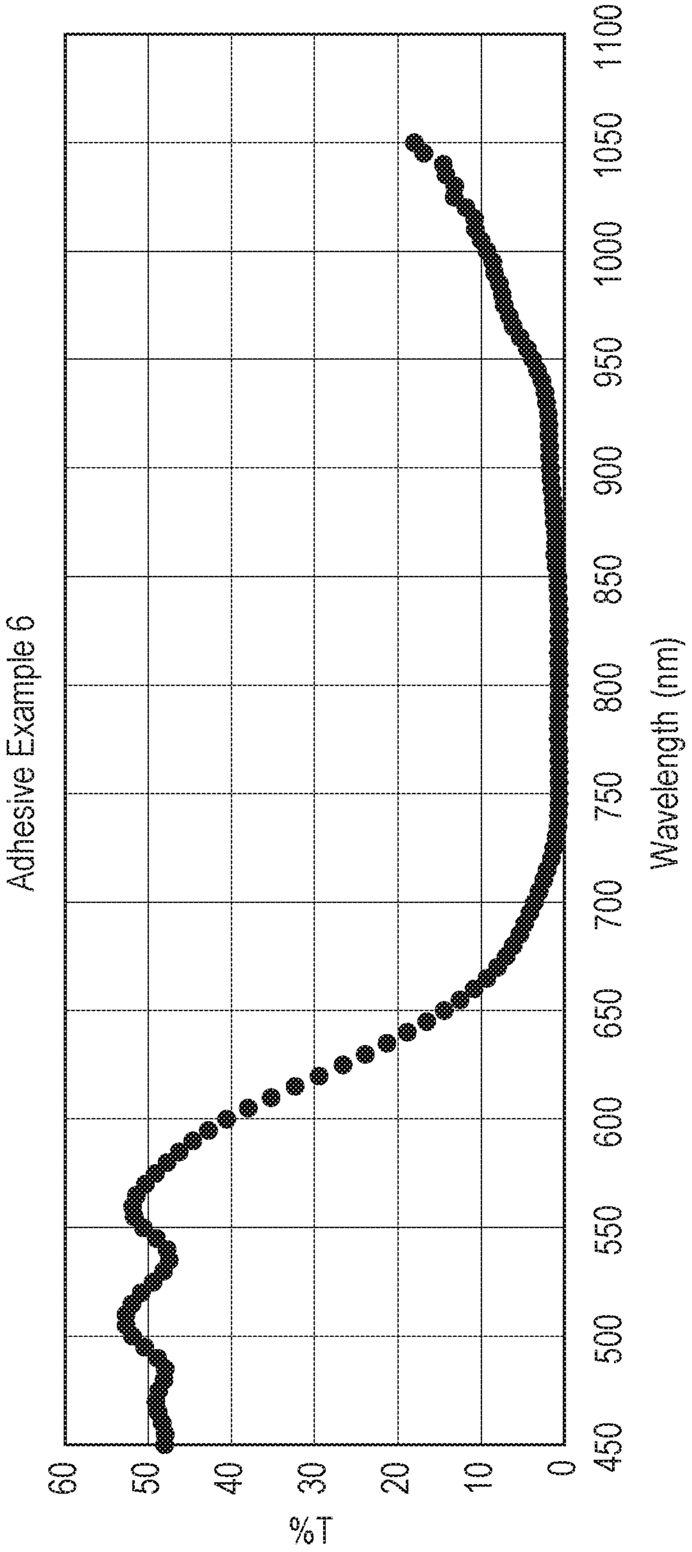
FIG. 7 is a graph of the % Transmission of Adhesive Example 6.
Figure 8:
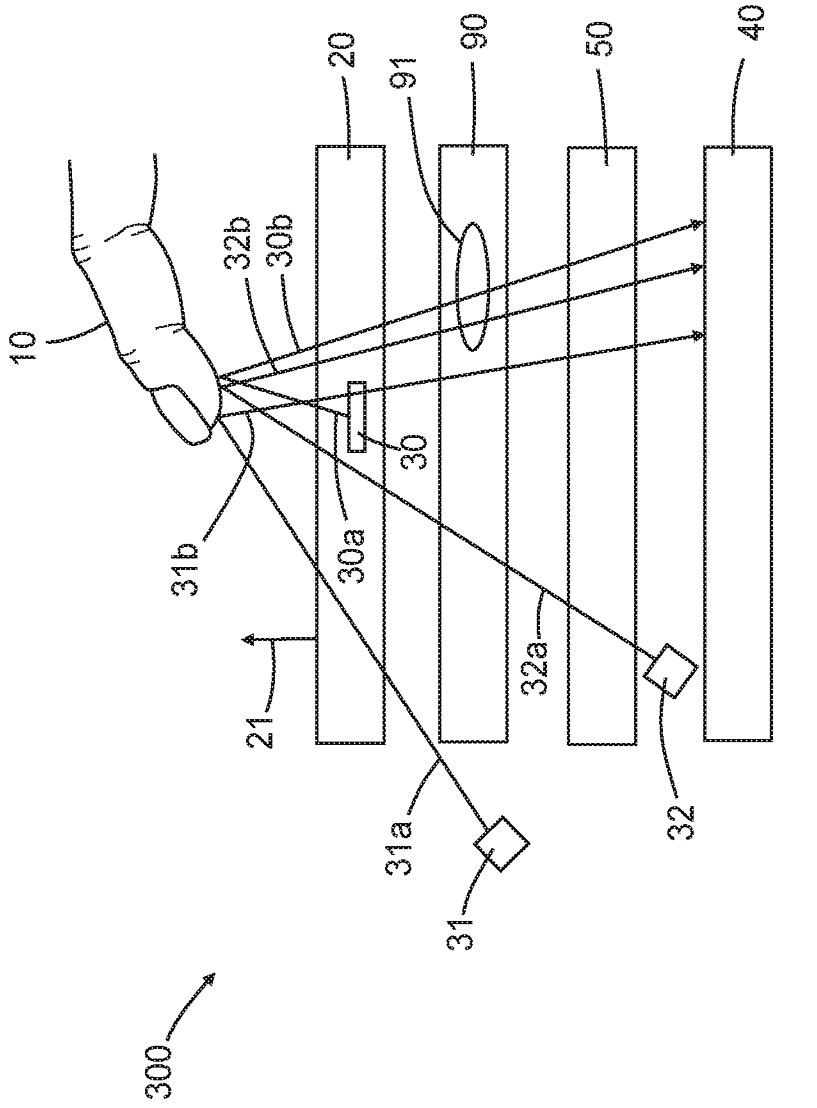
FIG. 8 is a cross-sectional view of a device of this disclosure.

Examples of optical devices of this disclosure are sensing devices. An example of a sensing device is a fingerprint sensing device. The disclosure may be more fully understood by reference to the Figures. FIGS. 1-7 are discussed in the Examples section below. FIG. 8 shows a cross-sectional view of optical device 300. Optical device 300 is configured to sense a presence of a finger 10. Optical device 300 comprises a multi-layer construction comprising emissive display 20, light redirecting film 90, multi-layer film article 50, and visible light detector 40. The emissive display 20 is configured to emit a visible image 21 in a visible wavelength range of from about 420 nm to about 680 nm. Visible light source 30, 31 and 32 are configured to emit light 30*a*, 31*a*, and 32*a* having a first wavelength 64 in the visible wavelength range. Visible light detector 40 is configured to detect the emitted light after the emitted light is reflected as 30*b*, 31*b*, and 32*b* from finger 10. Light redirecting film 90 is designed to change the direction of emitted light reflected from finger 10 (30*b*, 31*b*, 32*b*). Light redirecting film 90 comprises at least one optical lens 91. Multi-layer film article 50 is located in the optical pathway between the visible light source and the visible light detector and is shown in greater detail in FIG. 9.

Figure 9:
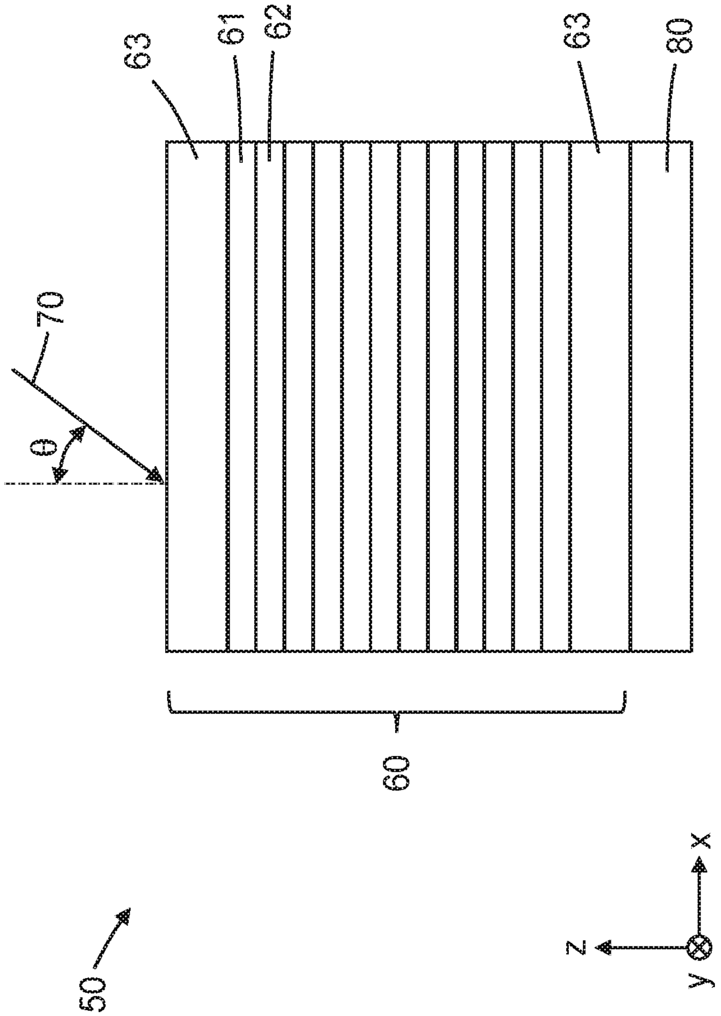
FIG. 9 is a cross-sectional view of multi-layer film article of this disclosure.

FIG. 9 shows a cross-sectional view of a multi-layer film article 50 of device 300 described above. Multi-layer film article 50 comprises first multi-layer optical film layer 60 and optically clear adhesive layer 80. First multi-layer optical film layer 60 comprises a plurality of alternating polymeric layers 61 and 62 numbering at least 10 in total, each of the polymeric layers having an average thickness less than about 400 nm. The multi-layer optical film layer 60 is configured such that for an incident light 70 incident on the first optical film layer and for at least one polarization state (x-axis), the plurality of polymeric layers reflects at least 70% of the incident light having the first wavelength 64 in the visible wavelength range for each of a first incident angle (θ) of less than about 5 degrees and a second incident angle of greater than about 45 degrees and reflects at least 70% of the incident light having a second wavelength 65 in the infrared wavelength range extending from about 680 nm to about 1100 nm for the first incident angle. The multi-layer optical film layer 60 transmits at least 40% of the incident light having the second wavelength 65 for the second incident light. The multi-layer optical film layer 60 optionally further comprises one or more skin layers 63, each skin layer having an average thickness of greater than about 500 nm. Optically clear adhesive layer 80 comprises a polymeric adhesive matrix and at least one infrared light absorbing material that absorbs light having the second wavelength.

FIG. 10 shows a graph of the % Transmission of a multi-layer film article 50, where the multi-layer film article does not comprise the optically clear adhesive layer 80 with an infrared absorbing material. This graph shows that for incident light with a 60° angle of incidence, the multi-layer film article permits the transmission of light of infrared light of wavelength 65. The optically clear adhesive layer 80 of the current disclosed articles is designed to absorb this infrared light not reflected by multi-layer film article 50.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wisconsin unless otherwise noted.

Table of Abbreviations

| Abbreviation or Trade Designation | Description |
|---|---|
| DYE-1 | 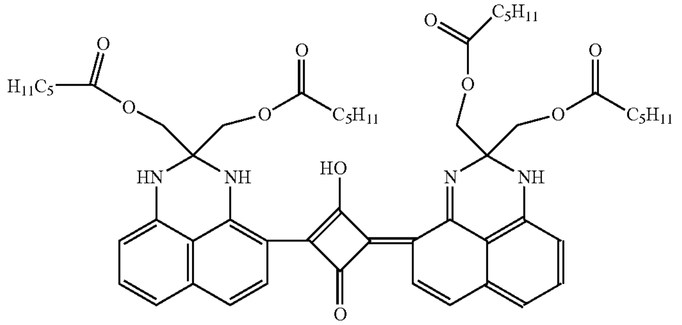 "WDR-3", CAS# 211991-63-8 |
| DYE-2 | 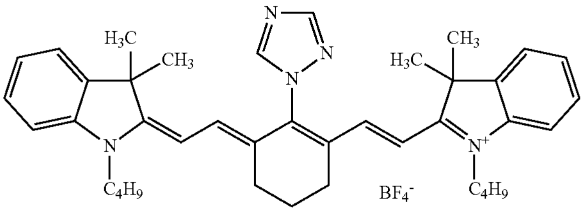 "DBT BF4", CAS# 494762-23-1 |
| DYE-3 | "LUMOGEN IR 765", commercially available from BASF |
| DYE-4 | "LUMOGEN IR 788", commercially available from BASF |
| CAB | Cellulose acetate butyrate polymer from Eastman Chemical |
| DYE-5 | Visible dye available from Epolin as EPOLIGHT 5839 |
| DYE-6 | Near infrared dye available from Epolin as EPOLIGHT 1117 |
| DYE-7 | Near infrared dye available from Epolin as EPOLIGHT 1178 |
| DYE-8 | Dye available from H. W. Sand as SDA 7293 |
| Silane | 3-glydidoxypropyl triethoxysilane available from Shin-Etsu Silicone as KBM403 |
| Polyisocyanate | aliphatic polyisocyanate available from Covesto as DESMODUR N3300A |
| 2-EHA | 2-ethylhexyl acrylate |
| Acm | Acrylamide |
| HEA | 2-Hydroxy ethyl acrylate |
| EHMA | 2-ethylhexylmethacrylate |
| Initiator | Initiator 2,2'-Azobis(2,4-dimethylvaleronitrile) commercially available as VAZO 52 |
| Liner-1 | Release liner of 50 micrometer thickness available as RF 22N from SKC Haas |
| Liner-2 | Release liner of 50 micrometer thickness available as RF 02N from SKC Haas |
| PET Film | Film of polyethylene terephthalate with a thickness of 5 mils (127 micrometers) |

Test Methods

% Transmission

Samples were tested for 00 Transmission over a wavelength range of 400-1200 nanometers using a Lambda 900 Spectrophotometer.

Preparation of Dyed Polymer Solutions

Solution 1:

0.0106 grams of DYE-4 (IR 788) was added to 2.14 grams of toluene, sonicated for an hour, then mixed with 1.32 grams of a 1500 solution of CAB in methyl ethyl ketone. The CAB polymer solution partially separated and had to be sonicated to re-dissolve the CAB with the toluene-dye blend.

Solution 2:

0.0128 grams of DYE-3 (IR 765) was added to 1.736 grams of 1-methoxy-2-propanol, sonicated for an hour, then mixed with 1.70 grams of a 15% solution of CAB in methyl ethyl ketone.

Solution 3:

0.0105 grams of DYE-1 (WDR-3) was added to 2.01 grams of methyl ethyl ketone, sonicated for an hour, then mixed with 1.35 grams of a 15% solution of CAB in methyl ethyl ketone.

Solution 4:

0.0101 grams of DYE-2 (DBT BF4) was added to 2.00 grams of methyl ethyl ketone, sonicated for an hour, then mixed with 1.36 grams of a 15% solution of CAB in methyl ethyl ketone.

Dye-Containing Coating Examples 1-4 (DCC1-DCC4)

Figure 1:
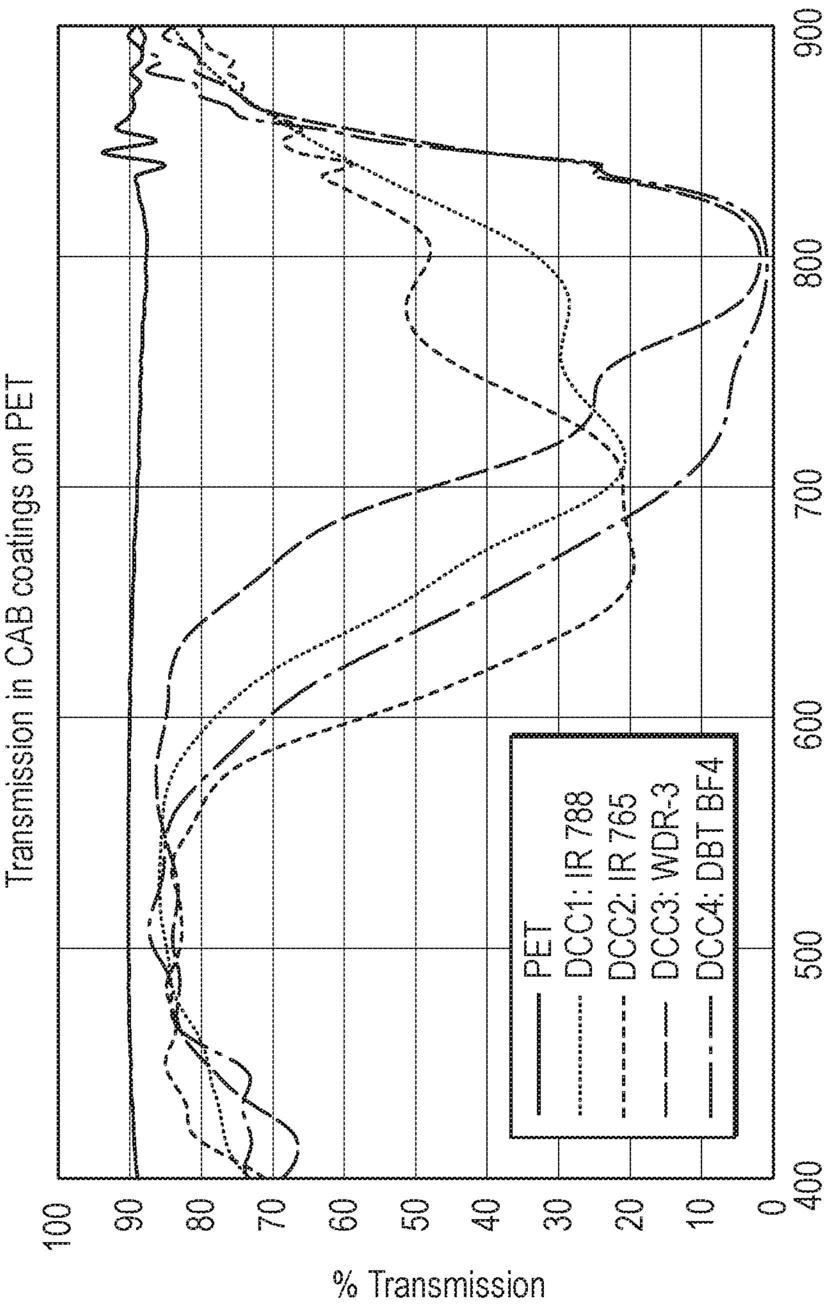
FIG. 1 is a graph of the % Transmission of the coatings for DCC1-DCC4.

Examples DCC1-DCC4 were prepared by coating each of Solutions 1-4, respectively, with a #26 wire wound Meyer rod on PET Film and drying each coating at 160° F. (71° C.) for 2 minutes. % Transmission was measured and is shown in FIG. 1.

Preparation of (Meth)Acrylate Adhesive-1

A mixture of 2-EHA/EHMA/HEA/Acm in mass ratio of 65/18/14/3 was prepared and diluted with ethyl acetate to provide a monomer concentration of 50 mass %. Initiator was then added in a ratio of 0.15 mass % based on monomer components, and the mixture was charged to a glass bottle where it was nitrogen-purged for 10 minutes. Subsequently, the bottle was sealed while kept under inert atmosphere and placed in a constant temperature bath at 55° C. for 6 hours. The reaction temperature was then increased to 75° C. for an additional 4 hours. A transparent viscous solution was obtained. The weight average molecular weight of the obtained acrylic copolymer was 563,000 daltons as measured by gel permeation chromatography versus polystyrene standards.

Preparation and Testing of Dye-Containing Adhesive Examples 1-6 (DCAE-1-DCAE-6)

Adhesive Example-1 (DCAE-1)

Figure 2:
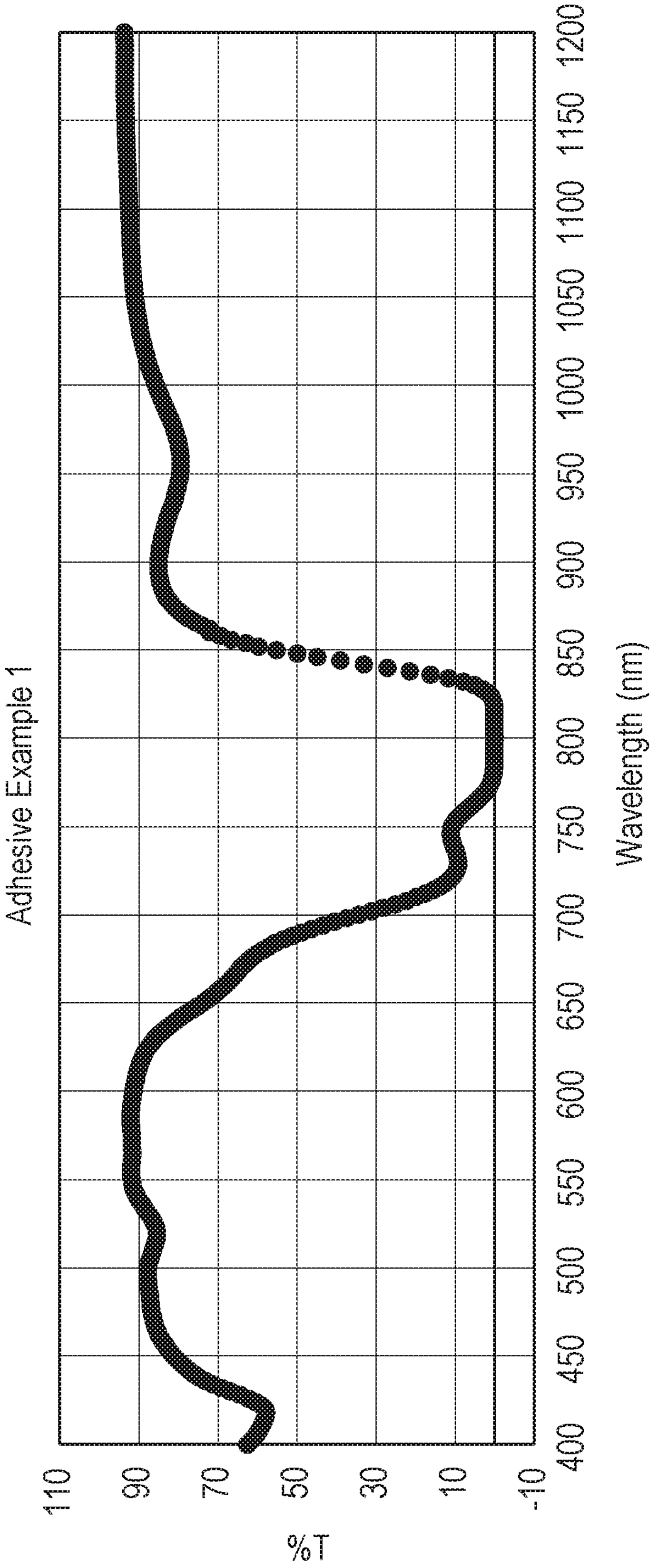
FIG. 2 is a graph of the % Transmission of Adhesive Example 1.

To the solution of (meth)acrylate adhesive-1, Silane, Polyisocyanate and DYE-1 were added in the ratios of 0.05, 0.6 and 2 mass parts per hundred, respectively, based on dry copolymer mass. The prepared solution was coated on Liner-1 and dried in an oven at 70° C. for 20 minutes. The thickness of the PSA after drying was 25 micrometers. Subsequently, this PSA surface was laminated with Liner-2. The % Transmission was measured as shown in FIG. 2.

Adhesive Example-2 (DCAE-2)

Figure 3:
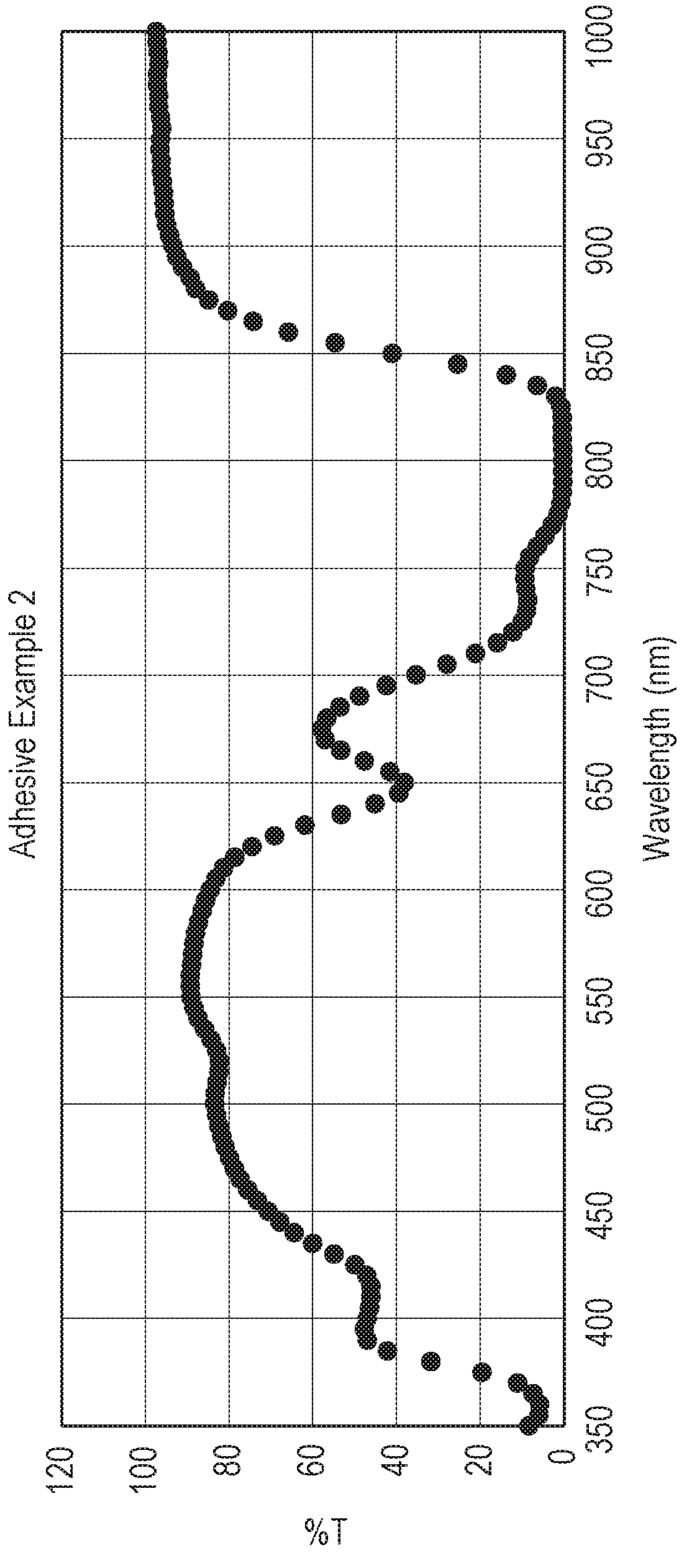
FIG. 3 is a graph of the % Transmission of Adhesive Example 2.

To the solution of (meth)acrylate adhesive-1, Silane, Polyisocyanate, DYE-1, and DYE-5 were added in the ratios of 0.05, 0.6, 2, and 2 mass parts per hundred, respectively, based on dry copolymer mass. The prepared solution was coated on Liner-1 and dried in an oven at 70° C. for 20 minutes. The thickness of the PSA after drying was 25 micrometers. Subsequently, this PSA surface was laminated with Liner-2. The % Transmission was measured as shown in FIG. 3.

Adhesive Example-3 (DCAE-3)

Figure 4:
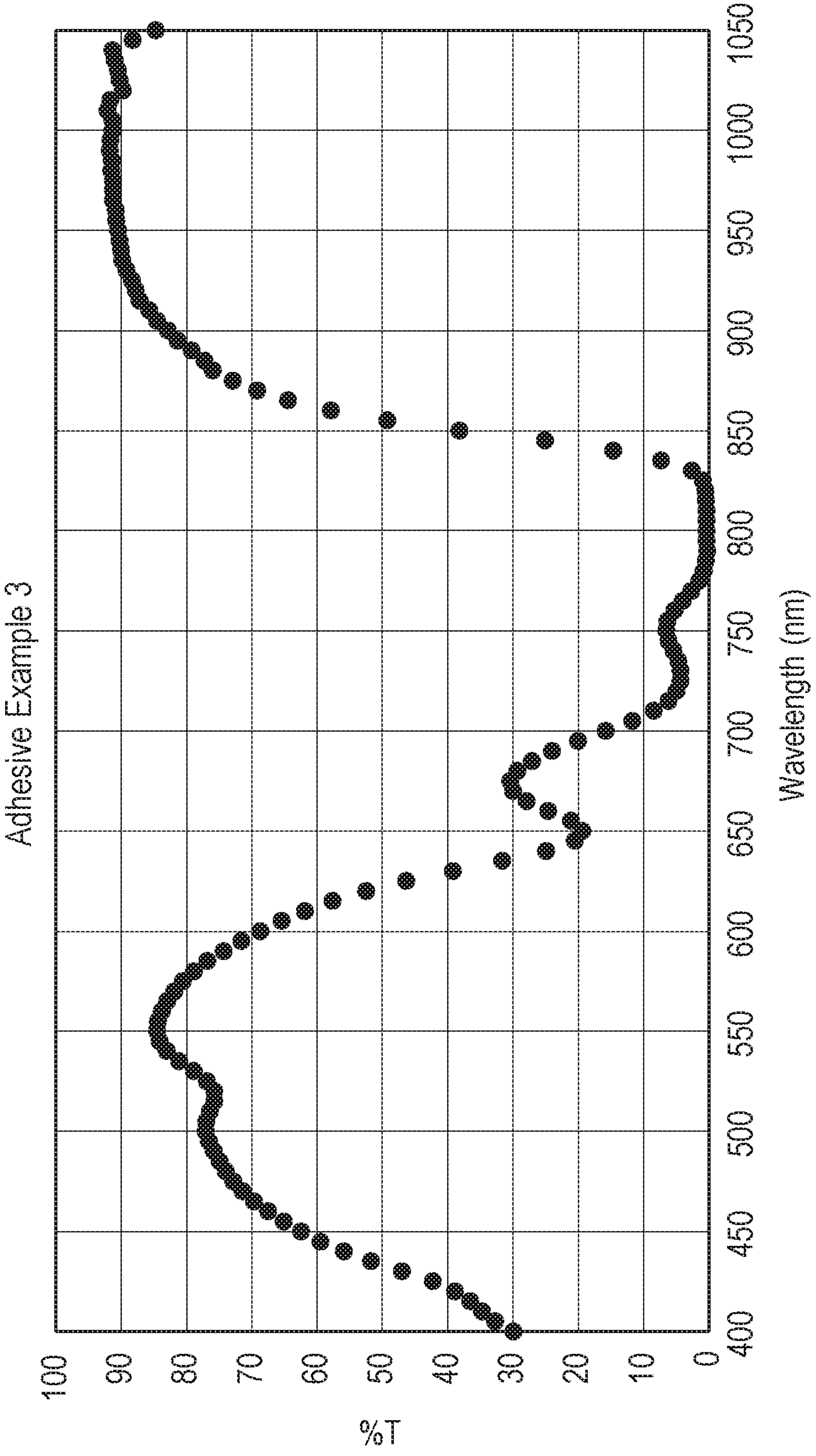
FIG. 4 is a graph of the % Transmission of Adhesive Example 3.

To the solution of (meth)acrylate adhesive-1, Silane, Polyisocyanate, DYE-1, DYE-5, and DYE-3 were added in the ratios of 0.05, 0.6, 2, 2, and 0.2 mass parts per hundred, respectively, based on dry copolymer mass. The prepared solution was coated on Liner-1 and dried in an oven at 70° C. for 20 minutes. The thickness of the PSA after drying was 25 micrometers. Subsequently, this PSA surface was laminated with Liner-2. The % Transmission was measured as shown in FIG. 4.

Adhesive Example-4 (DCAE-4)

Figure 5:
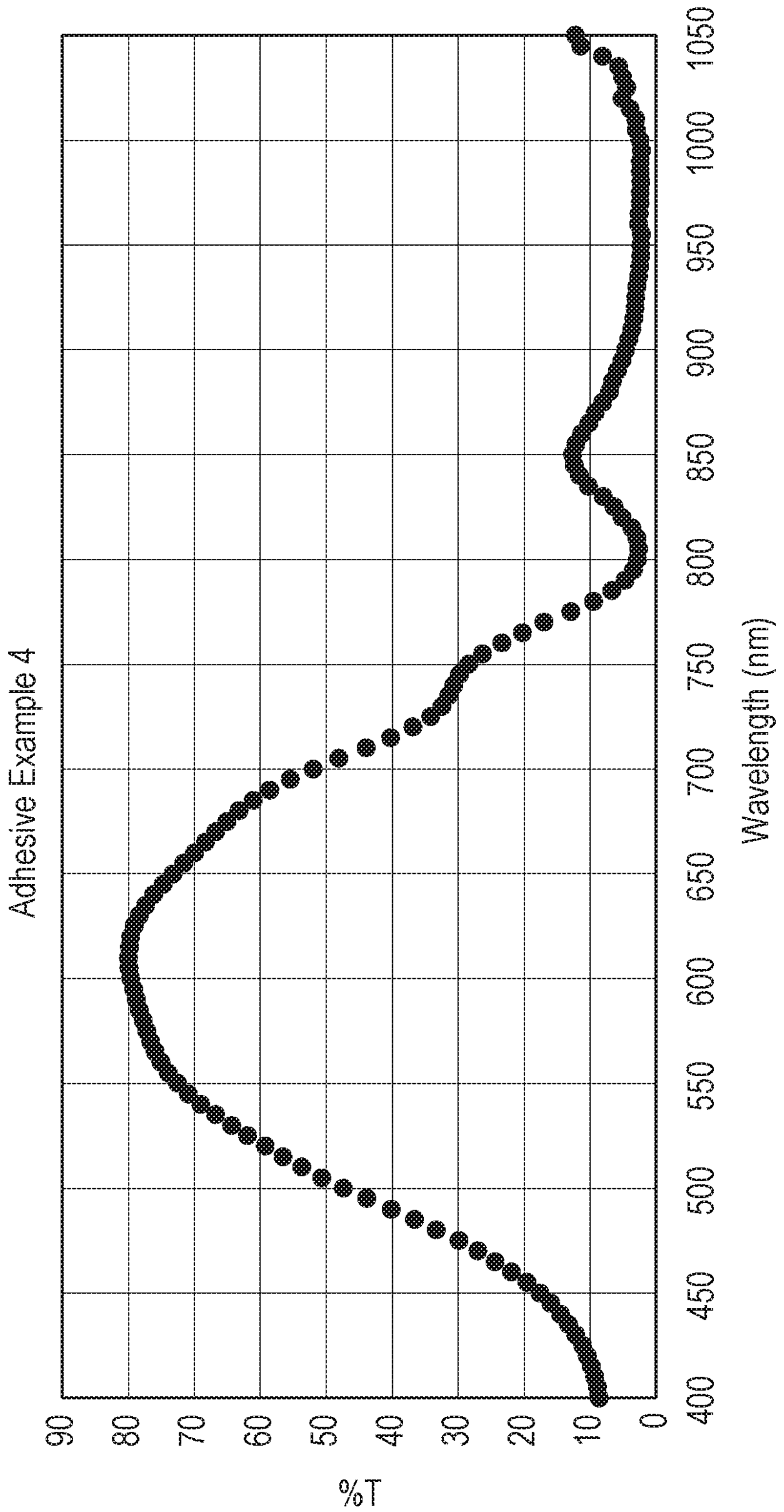
FIG. 5 is a graph of the % Transmission of Adhesive Example 4.

To the solution of (meth)acrylate adhesive-1, Silane, Polyisocyanate, DYE-1, and DYE-6 were added in the ratios of 0.05, 0.6, 2, and 1.5 mass parts per hundred, respectively, based on dry copolymer mass. The prepared solution was coated on Liner-1 and dried in an oven at 70° C. for 20 minutes. The thickness of the PSA after drying was 25 micrometers. Subsequently, this PSA surface was laminated with Liner-2. The % Transmission was measured as shown in FIG. 5.

Adhesive Example-5 (DCAE-5)

To the solution of (meth)acrylate adhesive-1, Silane, Polyisocyanate, DYE-1, and DYE-7 were added in the ratios of 0.05, 0.6, 2, and 1.5 mass parts per hundred, respectively, based on dry copolymer mass. The prepared solution was coated on Liner-1 and dried in an oven at 70° C. for 20 minutes. The thickness of the PSA after drying was 25 micrometers. Subsequently, this PSA surface was laminated with Liner-2. The % Transmission was measured as shown in FIG. 6.

Adhesive Example-6 (DCAE-6)

To the solution of (meth)acrylate adhesive-1, Silane, Polyisocyanate, and DYE-8 were added in the ratios of 0.05, 0.6, 2, and 1.5 mass parts per hundred, respectively, based on dry copolymer mass. The prepared solution was coated on Liner-1 and dried in an oven at 70° C. for 20 minutes. The thickness of the PSA after drying was 25 micrometers. Subsequently, this PSA surface was laminated with Liner-2. The % Transmission was measured as shown in FIG. 7.

What is claimed is:

1. An optical device configured to sense a presence of a finger, the optical device comprising:
- an emissive display configured to emit a visible image in a visible wavelength range extending from about 420 nm to about 680 nm;
- a visible light source configured to emit light having a first wavelength in the visible wavelength range;
- a visible light detector configured to detect the emitted light after the emitted light is reflected by the finger; and a multi-layer film article in a pathway between the visible light source and the visible light detector, wherein the multi-layer film article comprises:

a first optical film layer comprising a plurality of polymeric layers numbering at least 10 in total, each of the polymeric layers having an average thickness less than about 400 nm, such that for an incident light incident on the first optical film layer and for at least one polarization state, the plurality of polymeric layers:

reflects at least 70% of the incident light having the first wavelength for each of a first incident angle of less than about 5 degrees and a second incident angle of greater than about 45 degrees;

reflects at least 70% of the incident light having a second wavelength in an infrared wavelength range extending from about 680 nm to about 1100 nm for the first incident angle; and transmits at least 40% of the incident light having the second wavelength for the second incident angle; and an optically clear adhesive layer disposed on at least a portion of the first optical film layer, and wherein the optically clear adhesive layer comprises:

a polymeric adhesive matrix; and at least one infrared light absorbing material that absorbs light having the second wavelength.

2. The optical device of claim 1, wherein the at least one infrared light absorbing material has a ratio of a minimum transmission at 680-1100 nanometers to a transmission at 500 nanometers of from 0 to 0.5.

3. The optical device of claim 1, wherein the at least one infrared light absorbing material comprises a diimonium dye, an anthraquinone dye, an aminium dye, a cyanine dye, a merocyanium dye, a croconium dye, a squarylium dye, a rylene dye, an azulenium dye, a polymethyne dye, a naphthoquinone dye, a pyrilium dye, a phthalocyanine dye, a naphthalocyanine dye, a naphthlolactam dye, an azo dye, an indigo dye, a perinone dye, a terrylene dye, a dioxadine dye, a quinacridone dye, an isodorynone dye, a quinophthalone dye, a pyrrol dye, or a thioindigo dye.

4. An optical device configured to sense a presence of a finger, the optical device comprising:

a visible light source configured to emit light having a first wavelength in a visible wavelength range extending from about 420 nm to about 680 nm;

a visible light detector configured to detect the emitted light after the emitted light is reflected by the finger; and a multi-layer film article in a pathway between the visible light source and the visible light detector, wherein the multi-layer film article comprises:

a first optical film layer comprising a plurality of polymeric layers, such that for an incident light incident on the first optical film layer and for at least one polarization state, the plurality of polymeric layers:

reflects at least 70% of the incident light having the first wavelength for each of a first incident angle of less than about 5 degrees and a second incident angle of greater than about 45 degrees;

reflects at least 70% of the incident light having a second wavelength in an infrared wavelength range extending from about 680 nm to about 1100 nm for the first incident angle; and transmits at least 40% of the incident light having the second wavelength for the second incident angle; and an optically clear adhesive layer disposed on at least a portion of the first optical film layer, and wherein the optically clear adhesive layer comprises:

a polymeric adhesive matrix; and at least one infrared light absorbing material that absorbs light having the second wavelength.

5. The optical device of claim 4, wherein the at least one infrared light absorbing material has a ratio of a minimum transmission at 680-1100 nanometers to a transmission at 500 nanometers of from 0 to 0.5.

6. The optical device of claim 4, wherein the at least one infrared light absorbing material comprises a diimonium dye, an anthraquinone dye, an aminium dye, a cyanine dye, a merocyanium dye, a croconium dye, a squarylium dye, a rylene dye, an azulenium dye, a polymethyne dye, a naphthoquinone dye, a pyrilium dye, a phthalocyanine dye, a naphthalocyanine dye, a naphthlolactam dye, an azo dye, an indigo dye, a perinone dye, a terrylene dye, a dioxadine dye, a quinacridone dye, an isodorynone dye, a quinophthalone dye, a pyrrol dye, or a thioindigo dye.

* * * * *